(12) United States Patent
Didier

(10) Patent No.: US 7,649,806 B2
(45) Date of Patent: Jan. 19, 2010

(54) MARKOV SEQUENTIAL DETECTOR

(75) Inventor: Billon Didier, Brest (FR)

(73) Assignee: Thales, Neuilly-sur-Seine (FR)

( * ) Notice: Subject to any disclaimer, the term of this patent is extended or adjusted under 35 U.S.C. 154(b) by 0 days.

(21) Appl. No.: 11/912,924

(22) PCT Filed: Apr. 18, 2006

(86) PCT No.: PCT/EP2006/061630

§ 371 (c)(1),
(2), (4) Date: Oct. 29, 2007

(87) PCT Pub. No.: WO2006/117290

PCT Pub. Date: Nov. 9, 2006

(65) Prior Publication Data

US 2008/0186225 A1    Aug. 7, 2008

(30) Foreign Application Priority Data

Apr. 29, 2005    (FR) .................................. 05 04390

(51) Int. Cl.
 *G01S 15/66* (2006.01)
(52) U.S. Cl. ....................................................... 367/98
(58) Field of Classification Search ................... 367/99, 367/98; 704/256–256.8; 706/15–62; 342/195
See application file for complete search history.

(56) References Cited

U.S. PATENT DOCUMENTS

| 5,675,706 | A | * | 10/1997 | Lee et al. ..................... 704/256 |
| 5,832,430 | A | * | 11/1998 | Lleida et al. ................. 704/256 |
| 5,886,950 | A |   | 3/1999  | Billon |
| 5,900,835 | A |   | 5/1999  | Stein |
| 6,038,526 | A |   | 3/2000  | Stein |
| 6,304,513 | B1 |  | 10/2001 | Billon |
| 6,937,539 | B2 |  | 8/2005  | Kervern et al. |
| 6,985,406 | B2 |  | 1/2006  | Billon |
| 7,177,233 | B2 |  | 2/2007  | Billon |
| 2008/0186225 | A1 | * | 8/2008 | Didier ........................ 342/195 |

FOREIGN PATENT DOCUMENTS

FR    2885225 A1  *  11/2006

OTHER PUBLICATIONS

Parsons, Nigel H., "A track-before-detect algorithm for active sonar based on a hidden Markov model", Journal of the Acoustical Society of America, vol. 123, No. 5, pt. 2, May 2008, p. 3947.*
Cappel, D. Van and P. Alinat, "Frequency Line Extractor Using Multiple Hidden Markov Models", IEEE Oceans '98 Conference Proceedings, vol. 3, Sep. 28-Oct. 1, 1998, pp. 1481-1485.*

(Continued)

*Primary Examiner*—Dan Pihulic
(74) *Attorney, Agent, or Firm*—Lowe Hauptman Ham & Berner, LLP

(57) ABSTRACT

The initial detection of a signal of interest in a data stream involves transmitting a signal received by a sonar or a radar to signal detection equipment wherein a signal of interest is characterized by a state model x(t) with values in a finite set $\{x_1, \ldots, x_N\}$, to which there corresponds a finite set $\{\omega_1, \ldots, \omega_N\}$ of N values of an observation variable $\omega$, characteristic of this signal. To detect the signal of interest a detection criterion $\Lambda_n(t)$ is simultaneously calculated in two different ways. The larger of the two calculated values is assigned to the criterion of $\Lambda_n(t)$ which is then compared with a detection threshold.

12 Claims, 1 Drawing Sheet

OTHER PUBLICATIONS

Sitbon, S. and J.M. Passerieux, "New Efficient Target Tracking Based Upon Hidden Markov Model and Probabilistic Data Association", 29th Asilomar Conference on Signals, Systems and Computers, 1996, pp. 849-854.*

Le Cadre, Jean-Pierre and Olivier Tremois, "Bearings-Only Tracking for Maneuvering Sources", IEEE Transactions on Aerospace and Electronic Systems, vol. 34 No. 1, Jan. 1998, pp. 179-193.*

Strens, Malcolm J.A. and Ian N. Gregory, "Tracking in cluttered images", Image and Vision Computing, vol. 21, 2003, pp. 891-911.*

Biillon, Didier, "A new detection scheme: the sequential Markov detector", Proceedings of Applied Stoachastic Models and Data Analysis, May 17-20, 2005, pp. 1149-1159.*

Angelova et al., "Monte Carlo-Based Filter for Target Tracking with Feature Measurement", Information Fusion, Proceedings of the Fifth International Conference IEEE, vol. 2, pp. 1499-1505 (2002) XP010594371.

Johnston et al., Performance Analysis of a Track Before Detect Dynamic Programming Algorithm:, Acoustics, Speech, and Signal Processing, ICASSP '00, Proceedings, IEEE International Conference, vol. 1, pp. 49-52 (2000) XP010507265.

U.S. Patent Application No. 377 923 filed Jun. 20, 1989, Didier Billon (Withdrawn).

U.S. Appl. No. 08/290,908, filed Feb. 12, 1993, Didier Billon et al. (Abandoned).

* cited by examiner

MARKOV SEQUENTIAL DETECTOR

CROSS-REFERENCE TO RELATED APPLICATIONS

The present Application is based on International Application No. PCT/EP2006/061630, filed Apr. 18, 2006, which in turn corresponds to France Application No. 05 04390, filed Apr. 29, 2005, and priority is hereby claimed under 35 USC §119 based on these applications. Each of these applications are hereby incorporated by reference in their entirety into the present application.

FIELD OF THE INVENTION

The present invention relates to the general problem of detection by sonar or radar. It is concerned in particular with the initial detection of a signal of interest in a data stream corresponding to the signal received by such equipment, also called a sensor.

CONTEXT OF THE INVENTION

Prior Art

The general Automatic Detection and Tracking function (ADT in English) is a function commonly used in sonars and radars. The object of this function is to process the data stream received by the system considered so as to detect the presence of signals of interest and to analyze the evolution of the contact from which this signal originates. This evolution generally occurs in the spatial domain and/or in the frequency domain. The data analyzed can be represented by functions of the form $y(t, \omega)$ dependent on a time variable t and an observation variable $\omega$ which may be for example the frequency of the signal received or else the direction of arrival (bearing) of the signal.

Generally the ADT function operates on a contact in two successive phases.

First of all, the ADT function determines, for each instant t considered and for each value of the observation variable $\omega$, whether a signal emanating from an object of interest is or is not present. This is the detection phase.

Thereafter, when a positive decision has been taken for an instant $t_{det}$, the ADT function evaluates the value $\omega(t)$ of the observation variable $\omega$, and possibly of the state $x(t)$, of the detected object, for subsequent instants t ($t \geq t_{det}$). This is the tracking phase. The detection phase is also called the track initialization phase.

The initialization phase and the tracking phase both constitute processes for associating data over time. But, while tracking works only on a restricted amount of data in the vicinity of the tracks, track initialization is carried out on all the data present. This is why track initialization (detection) is carried out with processing operations that are simple to implement, while tracking is generally implemented by means of powerful processing algorithms, requiring a big calculation load, such as algorithms based on utilizing state models.

This constitutes per se a rather unsatisfactory situation since the quality of the detection very obviously suffers from the relative simplicity of the track initialization algorithms.

In most existing sonars and radars, the initialization phase is based on an algorithm that more or less directly implements a known detection principle: detection of the "P out of N" type. Here, the integer N represents the duration of the detection test window along a discretized time axis. According to this known principle, detection is performed by taking into account, for the duration of the window, the number of instants for which an event that meets a determined simple criterion arises. Detection can therefore, for example, consist in calculating the number of instants n during the time span of the window, for which at least one signal sample, included in the window, exceeds a detection threshold $r_1$, and in comparing this number n with a number P ($P \leq N$). Thus, a signal is detected when there are such events at least P times in the window ($n \geq P$).

In certain known applications, this general principle is refined by adding the further condition that the mean value of the P largest events must be greater than a second detection threshold $r_2$, itself greater than the first threshold $r_1$.

In a known manner, the false alarm probability of the methods implementing this known principle depends on r1, on r2 and on the size of the test window in the domain of the observation data $\omega$. In particular, increasing the size of the test window $\Delta\omega$ in the domain of the observation data leads to an increase in the false alarm probability, but makes it possible to better circumvent detection losses related to the drifting over time of the signal in the observation domain.

In practice, these contradictory data lead to the need to search for more or less satisfactory compromises. Thus, to ensure an appropriate detection probability without overly favoring the occurrence of false alarms, $\Delta\omega$ is generally chosen so as to be, at the most, equal to the resolution of the sensor and the duration N of the test is chosen to be small enough for it not to be possible for the drifting of the signal over the duration of the measurement to exceed $\Delta\omega$. Moreover, the duration N of the window must not greatly exceed the duration of the shortest signal to be detected, otherwise the probability of detecting signals of this type, for a fixed false alarm probability, decreases.

This compromise leads to the need in particular to choose a duration N limited to a few units, a constraint which prevents full exploitation of the potential rise in the detection probability for signals of long duration. Thus, whatever variant of the "P out of N" detection principle is used, it always leads to the need to limit the duration N of the test window used, N generally being less than 10.

The implementation of an ADT function can also be carried out by using a known method consisting in forming, before detection, trial tracks, called candidate tracks, for which validation tests are performed. When a candidate track positively passes its validation test, a detection is signaled and the track becomes a validated track, subsequently managed by the tracking.

In this approach, known by the English term "Track before detect" (TBD), track initialization therefore consists in forming and testing candidate tracks on the data received. The data received are integrated along these tracks that are selected in accordance with a determined dynamical model, assigned to the type of object that one wishes to detect. The use of such a model makes it possible to integrate these data over a longer test duration than in the case where the "P out of N" criterion is employed. This approach is therefore particularly suitable for processing signals having a low signal-to-noise ratio. On the other hand, just as for the implementation of the "P out of N" criterion, here the processing is usually carried out on data blocks of fixed duration. It is then necessary either to make a compromise between detecting the short signals and detecting the long signals by fixing an intermediate duration, or to carry out several processing operations in parallel, having different durations of integration, thereby correspondingly multiplying the calculation cost.

PRESENTATION OF THE INVENTION

One of the aims of the invention is to propose a detection method making it possible in particular to perform track initialization of "Track before Detect" type whose duration of integration is not fixed but adapted to exploit the duration of the signal of interest received, so as to obtain a high detection probability while maintaining a low false alarm probability.

For this purpose the subject of the invention is a continuous method of detecting a signal s(t) present in a data stream y(t, ω) dependent on a discrete time variable t and an observation variable ω, the signal being characterized by a state model x(t) with values in a finite set $\{x_1, \ldots, x_N\}$, to which there corresponds a finite set $\{(\omega_1, \ldots, \omega_N\}$ of N values of the observation variable ω.

The method according to the invention formulates for each instant t and for each state $x_n$ a detection criterion $\Lambda_n(t)$, whose value at each instant t, for a state $x_n$, is calculated simultaneously in two different ways:

- as being a function of the product of the probability $P_n$ of the state $x_n$, and of the ratio of the conditional probabilities $p_1$ and $p_0$ of the datum y(t, $\omega_n$) in the absence and in the presence of a signal,
- as being a function of the product of one of the N values of the criterion that were calculated at the previous instant t−1, of the probability of transition $P_{n,m}$ between the state $x_m$ for which this value was calculated at the instant t−1 and the state $x_n$ considered, and of the ratio of the conditional probabilities $p_1$ and $p_0$ of the datum y(t, $\omega_n$) in the absence and in the presence of a signal.

The results of the two calculations are compared and the larger of the two calculated values is assigned to the criterion of $\Lambda_n(t)$.

According to the invention, the method comprises at least:

- an initialization step A where the N values of the detection criterion $\Lambda_n$ at the instant $t_0-1$ preceding the first instant of the data to be processed $t_0$ are fixed at predetermined values,
- a step B of calculating the N values of the criterion $\Lambda_n$ at the current instant t,
- a step C of detecting by comparison with a threshold the N values of the criterion that were determined at phase B, the overshooting of the detection threshold by a value of the criterion determining the presence of a signal in the state $x_n$ corresponding to this value of the criterion, at the current instant.

Steps B and C are carried out in an iterative manner until the detection criterion $\Lambda_n$ exceeds the fixed detection threshold at the instant $t_{det}$. A track is then created with the state $x_n$ at this instant. The values of the detection criterion $\Lambda_m(t_{det})$ for the states $x_m$ in a neighborhood of $x_n$, which are influenced by the maximum attained at the state $x_n$, are furthermore set to zero so as to prevent it being possible for these values that are close to the detection threshold to cause the initialization of a new track at the following instant $t_{det}+1$.

According to the known art, the tracking, which consists in updating the estimation of the state x(t) of each already initialized track, is performed at each instant before the implementation of the track initialization method of the present invention. The data associated with the tracks by the tracking are replaced with the mean value of the noise, so that these data cannot favor the initialization of new tracks. The track initialization processing of the invention can be coupled according to this principle with any tracking processing whatsoever.

According to the invention, the detection criterion $\Lambda_n$ is defined by the general relations:

$$\Lambda_n(t_0) = F\left(K_1 \cdot \frac{p_1(y(t_0, \omega_n))}{p_0(y(t_0, \omega_n))} P_n\right),$$

and $$\Lambda_n(t) = \max\left\{\begin{array}{c} F\left(K_2 \cdot \frac{p_1(y(t, \omega_n))}{p_0(y(t, \omega_n))} \cdot \max_{1 \leq m \leq N}\{P_{n,m} \cdot \Lambda_m(t-1)\}\right), \\ F\left(K_1 \cdot \frac{p_1(y(t, \omega_n))}{p_0(y(t, \omega_n))} P_n\right) \end{array}\right\}$$

where $t_0$ represents an initial instant, where $p_1$ and $p_0$ represent the conditional probability laws for the data y(t, ω) in the absence and in the presence of a signal, where F is an increasing function and $K_1$ and $K_2$ are two constants.

The method according to the invention advantageously implements an iterative algorithm based on utilizing a hidden Markov model (HMM according to English terminology) with which it associates an automatic reinitialization operation for the criterion $\Lambda_n$, conditioned by comparison between the initial probability $P_n$ and the quantity:

$$K \cdot \max_{1 \leq m \leq N}\{P_{n,m} \cdot \Lambda_m(t-1)\}.$$

According to a variant implementation of the method, the factor $K_1$ or the factor $K_2$ are regulated so as to maintain a reinitialization rate for the recursive calculation of $\Lambda_n$ that is near to a specified value R. The reinitialization rate is determined by the condition $$F\left(K_1 \cdot \frac{p_1(y(t, \omega_n))}{p_0(y(t, \omega_n))} P_n\right) > F\left(K_2 \cdot \frac{p_1(y(t, \omega_n))}{p_0(y(t, \omega_n))} \cdot \max_{1 \leq m \leq N}\{P_{n,m} \cdot \Lambda_m(t-1)\}\right).$$

According to a variant implementation of the method R is chosen equal to 0.5.

The method according to the invention can advantageously be used for initializing sonar tracks on spectral lines on the basis of observation data y(t, ω) for which ω is a frequency datum.

The method according to the invention can also advantageously be used for initializing sonar tracks on spectral lines on the basis of observation data y(t, ω) for which ω is a data pair (frequency, bearing).

DESCRIPTION OF THE FIGURES

Other characteristics and advantages will appear through the description which follows and the appended FIG. 1 which represents a basic flowchart of the method according to the invention.

DETAILED DESCRIPTION

Figure 1:
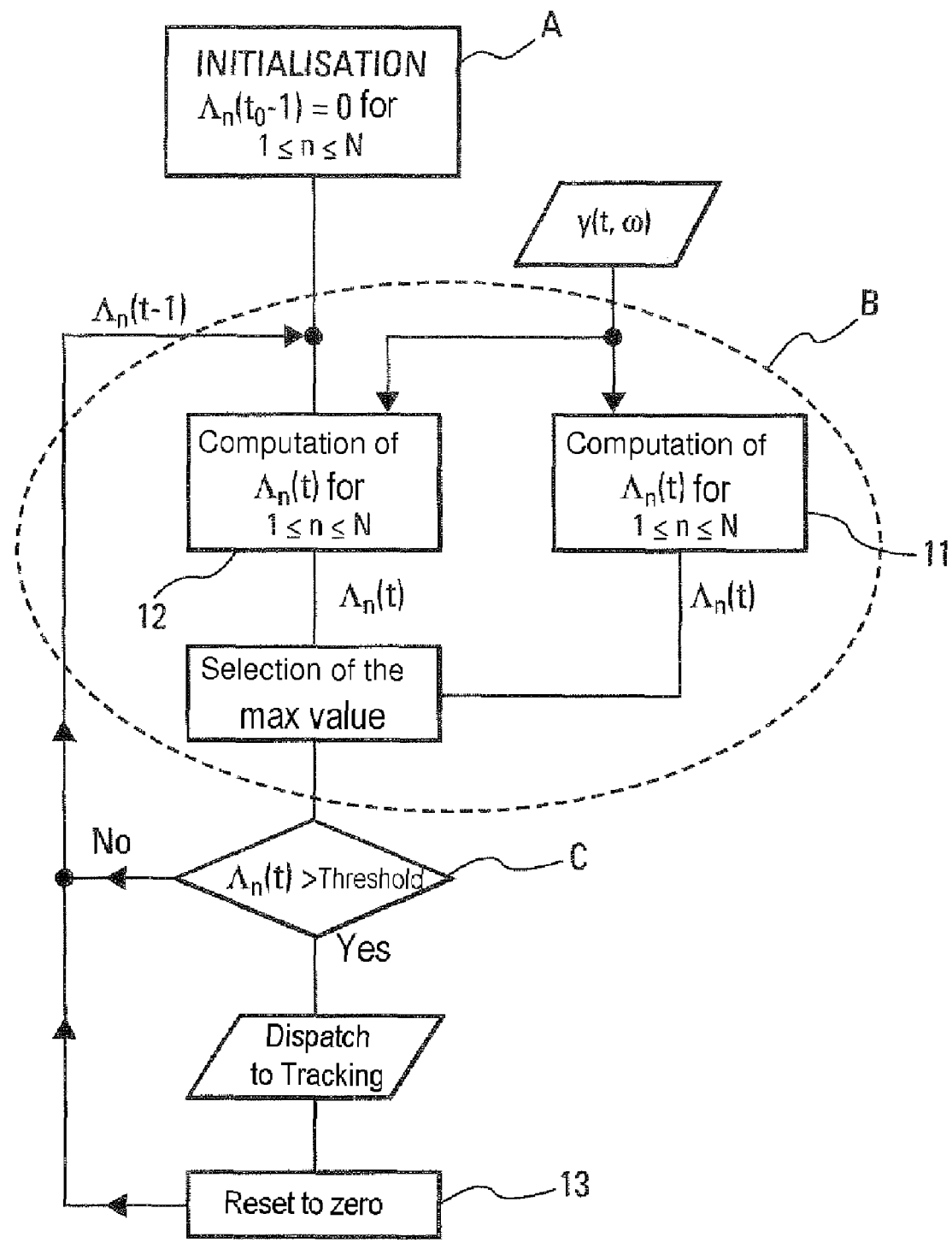

We present subsequently in the description the detection principle using a hidden Markov model, on which the detection method according to the invention is based; then the detection principle according to the invention itself.

Detection by means of a hidden Markov model is based on the following considerations:

An object of interest that one tries to detect through a signal s(t) along a path $\omega_s(t)$ in the observation space has an evolution x(t) in the state space over time which is a priori not known.

This evolution can be modeled by a Markov process model that, at each observation instant t, can take a value included in a state space E comprising N possible states $\{x_1, \ldots, x_N\}$. To each state $x_n$ there corresponds a value $\omega_n$ of the observation variable $\omega$. This observation can for example pertain to a single variable such as the set of frequency components of the signal received or else to several associated variables such as the frequency and the direction of observation (bearing).

The series of states x(t) that the object can take during its evolution over a time lying between an initial instant $t_0$ and an instant $t_0+\Delta t$ is called a candidate track. This series is denoted $X(t_0,\Delta t)=(x(t))_{t=t_0,\ldots,t_0+\Delta t}$.

The N probabilities $P_n=P[x(t_0)=x_n]$ of each of the states $x_n$ of the state space corresponding to the initial state $x(t_0)$, as well as the $N^2$ probabilities $P_{n,m}=P[x(t)=x_n|x(t-1)=x_m]$ associated with the various possible transitions between states, constitute known parameters associated with the chosen hidden Markov model.

So, the a priori probability that the behavior of the object follows any candidate track $X(t_0, \Delta t)$ is equal to the product of the probability of the state $x(t_0)$ times the probabilities of the transitions between the successive states x(t-1) and x(t) for $t_0+1 \leq t \leq t_0+\Delta t$.

The value of the observation variable corresponding to the state x(t) is denoted $\omega_x(t)$. The series of data $Y_X(t_0,\Delta t)=(y(t,\omega_x(t)))_{t=t_0,\ldots,t_0+\Delta t}$ corresponding to the candidate track $X(t_0, \Delta t)$ is modeled by an independent random process and its probability densities in the presence of noise only and in the presence of a signal and noise are denoted $p_0$ and $p_1$ respectively:

$$p_0(y(t,\omega_x(t)))=P[y(t,\omega_x(t))|H_0] \quad [1]$$

$$p_1(y(t,\omega_x(t)))=P[y(t,\omega_x(t))|x(t)] \quad [2]$$

where $H_0$ represents the assumption of an absence of signal corresponding to an object of interest in the processed data stream.

It results from the Markovian character of the random process with state x(t) and the independance of the random process with data $y(t,\omega_x(t))$ that the expression for the joint probability of $X(t_0, \Delta t)$ and $Y(t_0, \Delta t)$ is:

$$P[X(t_0,\Delta t),Y_X(t_0,\Delta t)]=P[y(t_0+\Delta t,\omega_x(t_0+\Delta t))|X(t_0,\Delta t)]\cdot P[Y_X(t_0,\Delta t-1)|X(t_0,\Delta t)]\cdot P[x(t_0+\Delta t)|x(t_0+\Delta t-1)]\cdot P[X(t_0,\Delta t-1)]. \quad [3]$$

In a hidden Markov model, the assumption is moreover made that the dependency of a datum $y(t_0+\Delta t, \omega_x(t))$ with respect to the state process is its dependency with respect to the state $x(t_0+\Delta t)$ only. Accordingly the joint probability of $X(t_0, \Delta t)$ and $Y(t_0, \Delta t)$ takes the following recursive form:

$$P[X(t_0,\Delta t),Y_X(t_0,\Delta t),]=p_1(y(t_0+\Delta t,\omega_x(t_0+\Delta t)))\cdot P[x(t_0+\Delta t)|x(t_0+\Delta t-1)]\cdot P[X(t_0,\Delta t-1),Y_X(t_0,\Delta t-1)]. \quad [4]$$

The probability of the series $Y_X(t_0, \Delta t)$ under the assumption $H_0$ being equal to $$P(Y_X(t_0,\Delta t)|H_0) = \prod_{t=t_0}^{t=t_0+\Delta t} p_0(y(t,\omega_x(t))),$$

the likelihood ratio $\Lambda_{X,Y}(t_0, \Delta t)$ of the association of the observation $Y_X(t_0, \Delta t)$ and of the model path $X(t_0, \Delta t)$ is then determined by the following relations:

$$\Lambda_{X,Y}(t_0, 0) = \frac{p_1(y(t_0,\omega_x(t_0)))}{p_0(y(t_0,\omega_x(t_0)))} \cdot P[x(t_0)] \quad [5]$$

$$\Lambda_{X,Y}(t_0, \Delta t) = \frac{p_1(y(t_0+\Delta t,\omega_x(t_0+\Delta t)))}{p_0(y(t_0+\Delta t,\omega_x(t_0+\Delta t)))} \cdot P[x(t_0+\Delta t)|x(t_0+\Delta t-1)] \cdot \Lambda_{X,Y}(t_0, \Delta t-1). \quad [6]$$

It is recalled here that at $t=t_0+\Delta t$, x(t) can a priori take any value $x_n$ whatsoever of the state space.

It is accordingly possible to determine for all the paths $X(t_0, \Delta t)$ for which x(t) takes the value $x_n$ at the instant $t=t_0+\Delta t$, the path for which the detection criterion takes its maximum value, denoted $\Lambda(x_n, t_0, \Delta t)$. This determination can for example be done by using an iterative algorithm such as the Viterbi algorithm for example. $\Lambda(x_n, t_0, \Delta t)$ will then be calculated by means of the following relations:

$$\Lambda(x_n, t_0, 0) = \frac{p_1(y(t_0,\omega_n))}{p_0(y(t_0,\omega_n))} P_n \quad [7]$$

$$\Lambda(x_n, t_0, \Delta t) = \frac{p_1(y(t_0+\Delta t, \omega_n))}{p_0(y(t_0+\Delta t, \omega_n))} \max_{1 \leq m \leq N} \{P_{n,m} \cdot \Lambda(x_m, t_0, \Delta t-1)\} \quad [8]$$

Thus, after the observation time $\Delta t$ the set of paths which maximize, for each possible value of $x(t_0+\Delta t)$, the detection criterion $\Lambda_{X,Y}(t_0,\Delta t)$ is known. Detection can then be completed by retaining from these paths only those for which the value $\Lambda(x_n, t_0, \Delta t)$ is greater than a given threshold.

Each detection can thereafter be used to initialize a track which will be processed elsewhere.

As may therefore be noted, the use of a hidden Markov model to account for the evolution of the parameters of an object of interest makes it possible to carry out a detection of this object by analyzing the likelihood ratio of only N evolution assumptions for the parameters of the object at each instant of the measurement, these evolution assumptions giving rise to N assumptions about the evolution $\omega_s(t)$ of the signal observation variable.

By comparing the values of $\Lambda(x_n, t_0, \Delta t)$ with a threshold for $1 \leq n \leq N$, it is possible to execute a detection test pertaining to the set of data $y(t,\omega)$ present during the time span $\Delta t$. If the test is positive in the state $x_n$, then the data stream analyzed during the time $\Delta t$ is considered to include the signal of an object to be detected having the state $x_n$ at the instant $t_0+\Delta t$.

Advantageously, among the known detection tests which operate on data received in a fixed time span, this detection test is that which makes it possible to maximize the probability of detecting an object of interest for a given false alarm probability. On the other hand, like all the tests pertaining to a window of finite duration, the use of a hidden Markov model associated with a detection criterion such as that defined by relations 7 and 8 can be improved if the duration of the observation window is adapted to take account of the duration of the signal of interest. Accordingly, it is known to carry out the processing described for all the possible values of $t_0$ and $\Delta t$, or at least in practice, for a certain number of judiciously chosen values. This choice generally results from a compromise to be found between the calculation cost and the detection performance.

In order to avoid resorting to a compromise regarding the choice of the size of the observation window, the method according to the invention implements, on the basis of a hidden Markov model, a modified detection criterion. This new detection criterion is calculated in a continuous manner from an origin instant $t_0$ until a detection occurs. As previously, this detection is characterized by the overshooting, by the detection criterion, of a given threshold. The method according to the invention thus combines the principle of sequential detection with that of detection on the basis of a hidden Markov model.

According to the invention, the maximum value for $x_n$, at the instant t, of the detection criterion is no longer determined on the basis of relations [7] and [8] of the Viterbi algorithm, but, for example, by the following relations:

$$\Lambda_n(t_0) = \frac{p_1(y(t_0, \omega_n))}{p_0(y(t_0, \omega_n))} P_n \quad [9]$$

$$\Lambda_n(t) = \frac{p_1(y(t, \omega_n))}{p_0(y(t, \omega_n))} \max\left\{ K \cdot \max_{1 \le m \le N} \{P_{n,m} \cdot \Lambda_m(t-1)\}, P_n \right\} \quad [10]$$

In relation [10], K corresponds to a constant factor less than or equal to 1. As may be noted, relation [9] corresponds to a particular way of expressing relation [10] for which $\Lambda_n(t_0-1)=0$ for all the values of n.

As for a conventional sequential detection, the calculation of the criterion $\Lambda_n$ does not make it necessary to fix a duration $\Delta t$ of given value.

According to the invention, the calculation of the detection criterion $\Lambda_n$ according to relation [10] involves a factor $$A = \max\left\{ K \cdot \max_{1 \le m \le N} \{P_{n,m} \cdot \Lambda_m(t-1)\}, P_n \right\}.$$

The factor A of relation [10] differs from the corresponding factor contained in relation [8]. This factor A according to the invention advantageously makes it possible to be able to carry out the test of the observation data in a continuous manner. The time span for which the test is carried out is therefore no longer here a span of fixed duration $\Delta t$ but a span making it possible to take into account the real duration of the signal.

The factor A also advantageously makes it possible to take into account the fact that a signal of interest can be present only for a fraction of the observation window and makes it possible not to integrate into the test of the data corresponding to the signal of interest, data present for the duration of the observation window and corresponding only to noise.

As may be noted the criterion $\Lambda_n(t)$ according to relation [10], taken as nonlimiting example, is related to the criterion $\Lambda(x_n, t_0, \Delta t)$ of the Viterbi algorithm by the following relation:

$$\Lambda_n(t) = K^{t-t_0} \Lambda(x_n, t_0, t-t_0) \quad [11]$$

where $t_0$ represents the instant of the last reinitialization of $\Lambda_n(t)$. According to the invention, the factor K is chosen in such a way that the following relation holds:

$$P\left[ K \max_{1 \le m \le N} \{P_{n,m} \cdot \Lambda_m(t-1)\} > P_n \mid H_0 \right] = \frac{1}{2} \quad [12]$$

where $H_0$ is the assumption that there is no signal of interest in the observed data stream.

This relation requires that the probabilities that a candidate track $X(t_0, t-t_0)$ is abandoned or continues to be explored are equal in the absence of a signal.

The detection criterion according to the invention, $\Lambda_n(t)$, can be calculated on the basis of the recursive relations [9] and [10]. This calculation can be performed in a similar manner to the Viterbi algorithm, apart from the reinitialization process.

The detection criterion $\Lambda_n(t)$ such as described in the foregoing is advantageously implemented on the data $y(t, \omega)$ by the detection method according to the invention, according to a general operating scheme similar to that illustrated by FIG. 1.

During the initialization phase A, the values of the criterion for the N states are calculated according to relation [10] by taking $\Lambda_n(t_0-1)=0$ for all the values of n.

During phase B which follows, the detection criterion is calculated for the N states at the successive instants according to relation [10]. This calculation is performed in a recursive manner until, for a given instant t, $\Lambda_n(t)$ exceeds the detection threshold for at least one value of n. The occurrence of such an overshoot causes the creation of a validated track, whose state at this instant is that where the overshoot of the detection threshold occurred, and the resetting to zero of the value of the criterion for this same state as well as for the neighboring states. The recursive calculation of phase B then can resume.

Relations [9] and [10] give, by way of example, a particular expression for the detection criterion implemented by the method according to the invention. More generally, the criterion $\Lambda_n(t)$ can be defined by the following relations:

$$\Lambda_n(t_0 - 1) = 0, \quad [13]$$

$$\Lambda_n(t) = \max\left\{ \begin{array}{l} F\left( K_2 \cdot \frac{p_1(y(t, \omega_n))}{p_0(y(t, \omega_n))} \cdot \max_{1 \le m \le N} \{P_{n,m} \cdot \Lambda_m(t-1)\} \right), \\ F\left( K_1 \cdot \frac{p_1(y(t, \omega_n))}{p_0(y(t, \omega_n))} P_n \right) \end{array} \right\} \quad [14]$$

where F is an increasing function, $K_1$ and $K_2$ are two constants, possibly regulated as a function of the values of the detection criterion for the N states. It is thus possible, for example, to fix $K_1$ and $K_2$ so as to maintain the reinitialization rate for the criterion close to a fixed value R, equal for example to 0.5.

Relations [9] and [10] are a particular case of relations [13] and [14] where F is the identity function, $K_1$ being equal to 1 and $K_2$ to K. Among the other possible choices for the function F, there are notably the logarithm functions which render the processing totally additive.

The diagram of FIG. 1 schematically summarizes the detection method according to the invention.

This method mainly comprises an initialization phase A, a phase B of calculating the value of a detection criterion by implementing a recursive calculation algorithm, and a phase C of testing the criterion calculated with respect to a detection threshold.

During phase A, the detection criterion $\Lambda_n(t)$ is initialized for a given instant $t_0-1$, by putting $\Lambda_n(t_0-1)=0$ for all the values of n.

Thereafter, during phase B, for each instant $t \ge t_0$, the calculation of the detection criterion $\Lambda_n(t)$ is performed in an iterative manner for each state $x_n$, by two calculation operations 11 and 12 conducted simultaneously and corresponding to relation [14]. The results are compared and the maximum value for each state n is retained.

On completion of each iteration, during phase C, the values $\Lambda_1(t), \ldots, \Lambda_N(t)$ retained are compared with the detection threshold.

If the test is negative for all the states $x_n$ the iteration loop continues at the next instant t+1 with a new pass through phase B.

If on the other hand the test is positive for a state $x_n$, a detection is signaled giving rise to the creation of a validated track at the state $x_n$ for the instant t. The values of the criterion for the state $x_n$ and the neighboring states then form the subject of a reset to zero 13. Then, the iteration loop continues at the next instant (phase B).

The detection method according to the invention can advantageously sit within a large number of applications. It is possible in particular to cite by way of example the sonar detection of objects whose evolution is observed through the variation over time of the frequency f of the signal received and the slope of variation f' of this frequency, also called the "frequency slope" in English.

In such an application the state variable x(t) is defined by the pair $\{f(t), f'(t)\}$. The method according to the invention is then applied to the observed data which represent for example the amplitude squared of the spectral components of a signal that are obtained by fast Fourier transform (FFT) operating on a sliding window and whose expression is $y(t, f) = |S(t,f)|^2$. The observation variable $\omega$ is in this case the frequency f of the spectral lines obtained by FFT.

In the case where the noise component of the signal A(t,f), of which y(t,f) represents the modulus squared, is Gaussian, with zero mean and unit variance, and the component of A(t,f) consisting of the signal to be detected is of constant amplitude, with signal-to-noise ratio $r_0$, the densities $p_0(y)$ and $p_1(y)$ follow laws of the $\chi^2$ type with two degrees of freedom, respectively centered and uncentered, with the expression:

$$p_0(y) = \exp(-y) \quad [15]$$

$$p_1(y) = \exp(-y - r_0) \cdot I_0(2\sqrt{r_0 y}) \quad [16]$$

$$\text{with } I_0(z) = \frac{1}{\pi} \int_0^\pi e^{z\cos(\theta)} d\theta.$$

Let $T_{FT}$ be the length of the sliding time window of the Fourier transformation, $k_t$ and $k_f$ the coefficients such that the temporal sampling interval for the data y(t, f) is equal to $T_{FT}/k_t$ and the frequency sampling interval for the states is equal to $T_{FT}^{-1}/k_f$. The frequency slope interval for the states is then fixed equal to $T_{FT}^{-2} \cdot k_t/k_f$, the ratio of the frequency interval to the temporal interval. The state space E is then defined as a finite network, with mesh cells of dimensions $(T_{FT}^{-1}/k_f, T_{FT}^{-2} \cdot k_t/k_f)$.

If we have no a priori knowledge about the frequency or the slope of the signals that we seek to detect, we put $P_n = 1/N$. The probabilities of transition from one state to another can be for example defined in the following manner:

$$\text{if } \frac{-1}{2k_f T_{FT}} \leq f_n - f_m - \frac{f'_n + f'_m}{2} \frac{T_{FT}}{k_t} < \frac{1}{2k_f T_{FT}} \quad [17]$$

$$\text{then } P_{n,m} = h\left(\frac{k_f T_{FT}^2}{k_t} |f'_n - f'_m|\right) \quad [18]$$

otherwise $P_{n,m} = 0$, where h represents a decreasing function such that:

$$h(0) + 2\sum_{i=1}^{\infty} h(i) = 1. \quad [19]$$

Such an expression for the transition probability conveys the fact that the probability of passing from the state $(f_m, f'_m)$ to the state $(f_n, f'_n)$ is not zero if and only if the difference between the frequency deviation $f_n - f_m$ and the mean value $(f'_n + f'_m)/2$ of the two slopes, multiplied by the temporal interval $T_{FT}/k_t$, is less than half the frequency interval $T_{FT}^{-1}/k_f$. In this case, the transition probability is a decreasing function of $|f'_n - f'_m|$.

For a given state $(f_m, f'_m)$ and a given slope deviation $(f'_n - f'_m)$, there is only one frequency $f_n$ which satisfies relation [17]. Relation [19] is therefore equivalent to the condition $$\sum_n P_{n,m} = 1,$$

which expresses the fact that the sum of the conditional probabilities $P[x(t) = x_n | x(t-1) = x_m]$ of the N possible states, knowing the previous state $x_m$, is equal to 1.

In practice, in this particular case, the function h which determines the transition probabilities is fixed in an arbitrary manner since a statistical model of the evolution of the frequency of the signals to be detected is only rarely available. It may however be recalled that the wider the top of the function h at 0, the better able is the processing to cope with the fast fluctuation of the frequency variation, but the lower is the performance of the processing as regards the detecting of the signals having a constant, or indeed zero, frequency slope f'.

The invention claimed is:

1. A method for detecting a source of signal from the signal received by a detector said received signal being in the form of a data stream y(t, $\omega$) dependent on a discrete time variable t and an observation variable $\omega$, relative to the source, said source being characterized by a state model x(t) with values determined among a finite set $\{x_1, \ldots, x_N\}$ of N values, to which there corresponds a finite set $\{\omega_1, \ldots, \omega_N\}$ of N values of said observation variable $\omega$, said method producing for each instant t a detection information $d(t, x_n)$, pointing out for each value $x_n$ of the state model X(t) if a source was detected, said detection information being produced by calculating for each instant t and for each value $x_n$ of the state model a value of a detection criterion $\Lambda_n(t)$ and comparing this value to a predetermined detection threshold, the detection information $d(t, x_n)$ pointing out that a source was detected by a value $x_n$ when the values of $\Lambda_n(t)$ calculated for this value $x_n$ exceeds the threshold; said method comprising the following steps:

a first step wherein, for each instant t the calculation of $\Lambda_n(t)$ is performed in a recursive manner for each state $x_n$, by two different calculation operations conducted simultaneously:

a first operation calculating $\Lambda_n(t)$ as a function of the product of the probability $P_n$ of the state $x_n$, and of the ratio of the conditional probabilities $p_1$ and $p_0$ of the corresponding datum $y(t, \omega_n)$ in the absence and in the presence of a signal;

a second operation calculating $\Lambda_n(t)$ as a function of the product of one of the N values of the criterion that were calculated at the previous instant t−1, of the probability of transition $P_{n,m}$ between the state $x_m$ for which this value was calculated at the instant $t-1$ and the state $x_n$ considered, and of the ratio of the conditional probabilities $p_1$ and $p_0$ of the corresponding datum $y(t, \omega_n)$ in the absence and in the presence of a signal;

the larger of the two calculated values of $\Lambda_n(t)$ being retained as being the value the criterion $\Lambda_n(t)$;

a second step wherein the retained value of $\Lambda_n(t)$ is compared to said detection threshold.

2. The method as claimed in claim 1 wherein the N values of the detection criterion $\Lambda_n$ at the instant $t_0-1$ preceding the instant $t_0$ of the beginning of the data stream processing are fixed at predetermined values.

3. The method as claimed in claim 2, wherein when $\Lambda_n(t)$ is greater than the detection threshold for a given instant t, the value of $\Lambda_n(t+1)$ for the following instant $t-1$ is calculated by the first operation by reinitializing $\Lambda_n(t)$ to zero.

4. The method as claimed in claim 3, in which the detection criterion $\Lambda_n(t)$ is defined from the results of the two calculating operations by the following relations:

$$\Lambda_n(t_0 - 1) = 0,$$

$$\Lambda_n(t) = \max\left\{\begin{array}{c} F\left(K_2 \cdot \frac{p_1(y(t, \omega_n))}{p_0(y(t, \omega_n))} \cdot \max_{1 \leq m \leq N}\{P_{n,m} \cdot \Lambda_m(t-1)\}\right), \\ F\left(K_1 \cdot \frac{p_1(y(t, \omega_n))}{p_0(y(t, \omega_n))} P_n\right) \end{array}\right\}$$

where $t_0$ is the first instant of the data to be processed, $\omega_n$ is the locus of the signal source in the observation space corresponding to the state $x_n$, where $p_1$ and $p_0$ represent the conditional probability laws for the data $y(t, \omega)$ in the absence and in the presence of a signal, where F is an increasing function, and where $K_1$ and $K_2$ are two arbitrarily chosen factors.

5. The method as claimed in claim 4, wherein the factor $K_1$ or the factor $K_2$ is regulated so as to maintain a reinitialization rate for the recursive calculation of $\Lambda_n$ that is determined by the condition $$F\left(K_1 \cdot \frac{p_1(y(t, \omega_n))}{p_0(y(t, \omega_n))} P_n\right) > F\left(K_2 \cdot \frac{p_1(y(t, \omega_n))}{p_0(y(t, \omega_n))} \cdot \max_{1 \leq m \leq N}\{P_{n,m} \cdot \Lambda_m(t-1)\}\right),$$

near to a specified value R.

6. The method as claimed in claim 5, wherein R is equal to 0.5.

7. The method as claimed in claim 1 applied to the initialization of sonar tracks on spectral lines on the basis of observation data $y(t, \omega)$ for which $\omega$ is a frequency datum.

8. The method as claimed in claim 3 applied to the initialization of sonar tracks on spectral lines on the basis of observation data $y(t, \omega)$ for which $\omega$ is a frequency datum.

9. The method as claimed in claim 4 applied to the initialization of sonar tracks on spectral lines on the basis of observation data $y(t, \omega)$ for which $\omega$ is a frequency datum.

10. The method as claimed in claim 1 applied to the initialization of sonar tracks on spectral lines on the basis of observation data $y(t, \omega)$ for which $\omega$ is a data pair (frequency, bearing).

11. The method as claimed in claim 3 applied to the initialization of sonar tracks on spectral lines on the basis of observation data $y(t, \omega)$ for which $\omega$ is a data pair (frequency, bearing).

12. The method as claimed in claim 4 applied to the initialization of sonar tracks on spectral lines on the basis of observation data $y(t, \omega)$ for which $\omega$ is a data pair (frequency, bearing).

* * * * *